R. A. FESSENDEN.
POWER PLANT.
APPLICATION FILED MAR. 8, 1909.
1,217,165. Patented Feb. 27, 1917.
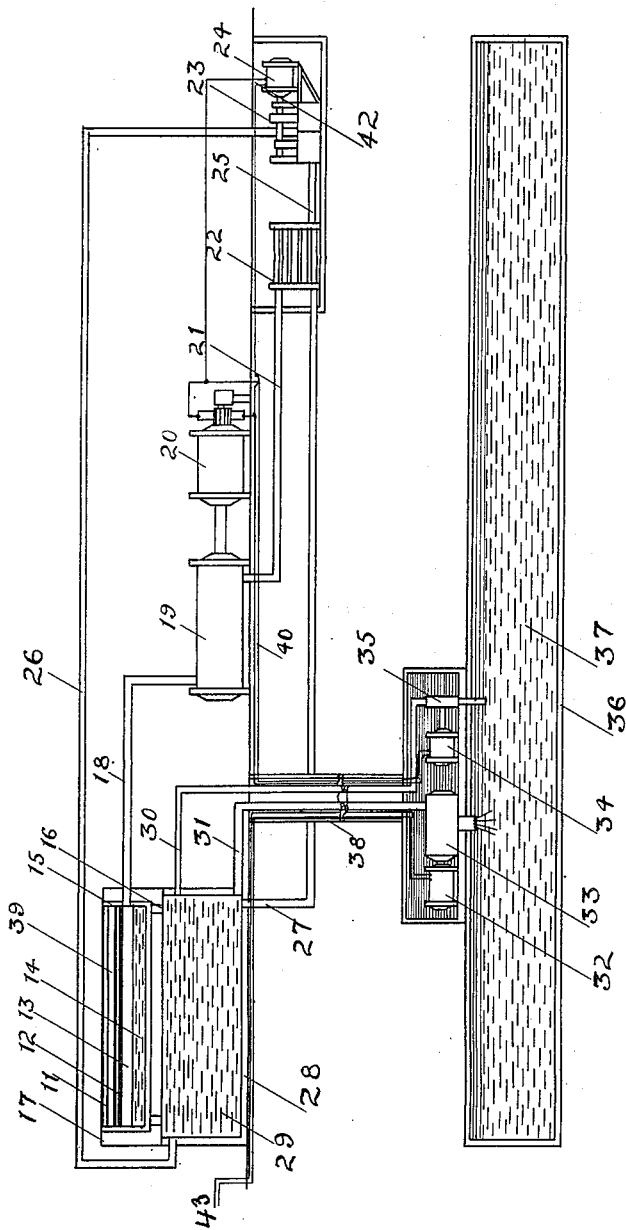
WITNESSES:
Jessie E. Bent
Florence M. Lyon
INVENTOR.
Reginald A. Fessenden.

UNITED STATES PATENT OFFICE.

REGINALD A. FESSENDEN, OF BRANT ROCK, MASSACHUSETTS.

POWER PLANT.

1,217,165.           Specification of Letters Patent.     Patented Feb. 27, 1917.

Application filed March 8, 1909. Serial No. 481,973.

*To all whom it may concern:*

Be it known that I, REGINALD A. FESSENDEN, a citizen of the United States, residing at Brant Rock, in the State of Massachusetts, have invented certain new and useful Improvements in Power Plants, of which the following is a specification.

My invention relates to the generation and storage of power and more particularly to the generation of power from natural sources, such as the sun's rays, and its storage.

In the accompanying drawings forming a part of this specification the figure shows a sectional view of apparatus for carrying out my invention.

The invention herein disclosed has for its object the generation of power from natural sources more particularly the sun's heat and the storage of power so obtained so that it can be used when desired.

The energy received on the earth's surface from the sun is very large. On an area of 100 yards square the received energy amounts to approximately 25,000 horsepower.

Attempts have been made to utilize this energy by generating steam, but with little success, owing to the low thermo-dynamic efficiency of the method employed. In U. S. application 309,471 filed April 2, 1906, applicant has disclosed a method depending upon the heating of air which has a higher efficiency than the methods depending upon the heating of water heretofore used but which is still capable of improvement, especially in the direction of larger output. From Prevost's law of radiation and other physical laws it is found that the temperature of an absorbing medium can be raised to a temperature of about 400°, which theoretically permits of fairly efficient utilization of the energy provided suitable means are used.

In the present invention such means are described.

14 is a body of water or other suitable working medium such as alcohol or gasolene contained in a tank 15 as shown, the walls of the tank being formed preferably of ferro-concrete, and covered inside and outside with a reflecting material such as tinned iron.

In the working medium is preferably dissolved a coloring matter which consists of a salt of iron or alum or a very finely divided black material or black dye, with the object of totally absorbing the sun's rays and so producing the maximum elevation of temperature desired.

The top of this tank is of wire glass 11 approximately ¼ of an inch thick in order to prevent destruction from hail and also to withstand the pressure due to the production of vapor in the tank from the sun's heat.

Beneath this wire glass is an air space 39 and beneath the air space a second layer of glass 12 which may be quite thin.

Surrounding the tank is a second covering 17, preferably formed of a reflecting substance such as tinned iron. 16 is a heat insulating support, for example formed of magnesia brick.

The object of the air space 39 and the second covering 17 is to prevent the medium being cooled off by the air blowing over the tank and to prevent heat from being conducted from the bottom of the tank down to ground.

By the use of these devices quite high temperature can be obtained, in fact water can be raised above the boiling point.

The amount of water in the tank should be sufficient to compensate so far as possible for momentary fluctuations in the sun's light, such as caused by the passage of clouds, etc., though this is not essential.

The glass coverings 11, 12 are preferably made of glass which is entirely transparent to the sun's light and to heat waves such as are received from the sun but to a certain degree opaque to said radiation such as is emitted from the working medium. This can be accomplished by adding a very small amount of iron salt to the glass while it is being made.

The vapor generated from the working fluid passes through the pipe 18 to the low pressure turbine 19 and so operates the dynamo 20.

In view of the low temperature rise of the working medium it is necessary to use a condenser 22 with the low pressure turbine, capable of producing a low vacuum.

23 is the condenser pump operated by the motor 24 which is driven by the dynamo 20. 21, 25, 27 are pipes connected to the condenser and the cooling water for the condenser is drawn from the reservoir 29, 42 is the surface of the ground.

The reservoir 29 of water is contained in the tank 28. A shaft 38 is sunk in the ground to a considerable depth, so as to obtain a high gravitational potential for the water. At the lower end of this tank is placed a lower reservoir 37, preferably lined with ferro-concrete 36.

34 is a motor driven by the dynamo 20 and itself driving the pump 35 which lifts water from the lower reservoir 37 to the upper reservoir 29.

33 is a turbine, preferably of the Pelton type operated by water flowing from the upper reservoir 29 and driving a dynamo 32, the leads 43 from which lead to the point at which it is desired to utilize the electrical energy.

In operation the sun's heat generates a vapor which drives the low pressure turbine 19, and the dynamo 20 produces power which may be used directly, or as shown may be stored by pumping water from the lower reservoir into the upper, the power being generated as needed by means of the Pelton wheel 33 and dynamo 32. The purpose of the underground plant is to store the energy generated by the solar tank in excess of that needed during daylight in order that it may be used for lighting and other purposes at night.

If the low reservoir be 1000 ft. below the upper a cubic yard of water will furnish the energy of one horsepower for one hour.

As the cost of excavating such a chamber and shaft amounts to approximately $2.00 per cubic yard and the depreciation is approximately 2%, the cost of storing power in this manner is extremely low.

In addition its efficiency is very high, as the combined efficiency of the pump and turbine may reach approximately 80%.

These figures may be compared with the cost of $100. per horse-power for a storage battery and the annual depreciation of approximately $15.00 and the efficiency of only 65%.

As the cost of producing power by steam per horse-power year is only approximately $25.00 it will be seen why it is impossible to commercially use storage batteries for storing the energy of natural sources, and why the present method provides such a means.

As regards the efficiency of the generating plant, the efficiency of a low pressure turbine working as described is comparatively high and may reach a figure of 15%.

Even at an efficiency of 10%, and assuming that the radiation reaching the earth is only 15000 horse-power, for 100 square yards it will be seen that by this means more than 1000 horse-power can be obtained from the sun's radiation from an area of 100 yards square.

The total cost of producing a horse-power year by this means I estimate would be in the neighborhood of $10.00.

Having thus described my invention and illustrated its use, what I claim as new and desire to secure by Letters Patent, is the following:

1. The method of obtaining energy from solar radiation which consists in heating a working liquid, by means of solar radiation, to a temperature lower than the boiling point of the said working liquid at atmospheric pressure; transforming all of said heated working fluid into vapor at a pressure less than that of the atmosphere; and causing said vapor, to act directly, at a pressure less than atmospheric, upon the moving element of a low pressure heat engine.

2. Apparatus for utilizing for power production by radiation all changes of temperature of a working fluid between initial temperature and boiling point produced by radiation, comprising a reservoir of working fluid, said reservoir being provided with a transparent cover containing an iron salt, in combination with a motor connected to be operated by the vapor of said fluid, and a vacuum cooling chamber for condensing said vapor.

3. Apparatus for obtaining power from radiation, comprising a reservoir, a working fluid contained therein and exposed to the action of radiation, means for protecting said fluid from loss of heat by convection, a low-pressure heat engine, connections to operate the same by the vapor of said fluid, a lower reservoir, an upper storage reservoir, a pump operated by said low-pressure heat engine for pumping water from said lower into said upper storage reservoir, and means for condensing said working fluid vapor by means of the water so transferred between said upper and lower reservoirs.

4. Apparatus for obtaining power by radiation, comprising a reservoir, a working fluid contained therein and exposed to the action of radiation, a low-pressure heat engine, connections to operate the same by the vapor of said fluid, a lower reservoir, an upper storage reservoir, a pump operated by said low-pressure heat engine for pumping water from said lower into said upper storage reservoir, and means for condensing said working fluid vapor by means of the water so transferred between said upper and lower reservoirs.

5. Apparatus for utilizing for power production by radiation all changes of temperature of a working fluid between initial temperature and boiling point produced by radiation, comprising a reservoir, a working fluid contained therein and exposed to the action of radiation, means for protecting said fluid against loss of heat by convection, a low-pressure turbine, connections to operate said turbine by the vapor of said fluid, a pump operated by said low pressure turbine for pumping water, and means for utilizing said water for condensing the vapor of said working fluid.

In testimony whereof I have hereunder signed my name in the presence of the two subscribed witnesses.

REGINALD A. FESSENDEN.

Witnesses:
JESSIE E. BENT,
FLORENCE M. LYON.